United States Patent
Cui et al.

(10) Patent No.: US 10,412,119 B2
(45) Date of Patent: Sep. 10, 2019

(54) MECHANISM FOR PROVIDING EXTERNAL ACCESS TO A SECURED NETWORKED VIRTUALIZATION ENVIRONMENT

(71) Applicant: Nutanix, Inc., San Jose, CA (US)

(72) Inventors: Miao Cui, Sunnyvale, CA (US); Kshitiz Jain, Raipur Chattisgarh (IN); Vineet Kahlon, Princeton, NJ (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 14/708,091

(22) Filed: May 8, 2015

(65) Prior Publication Data

US 2015/0326531 A1 Nov. 12, 2015

Related U.S. Application Data

(60) Provisional application No. 61/991,195, filed on May 9, 2014.

(51) Int. Cl.
*H04L 29/06* (2006.01)
*G06F 9/455* (2018.01)
*H04L 29/08* (2006.01)

(52) U.S. Cl.
CPC ........ *H04L 63/205* (2013.01); *G06F 9/45558* (2013.01); *H04L 63/029* (2013.01); *G06F 2009/45595* (2013.01); *H04L 67/10* (2013.01)

(58) Field of Classification Search
CPC ......... H04L 63/08; H04L 63/10; H04L 63/20; H04W 12/06; H04W 12/08
See application file for complete search history.

(56) References Cited

U.S. PATENT DOCUMENTS

| | | |
|---|---|---|
| 5,253,252 A | 10/1993 | Tobol |
| 5,884,308 A | 3/1999 | Foulston |
| 6,363,416 B1 | 3/2002 | Naeimi et al. |
| 6,684,397 B1 | 1/2004 | Byer et al. |
| 6,738,801 B1 | 5/2004 | Kawaguchi et al. |
| 6,928,589 B1 | 8/2005 | Pomaranski et al. |
| 7,379,419 B2 | 5/2008 | Collins |
| 7,421,578 B1 * | 9/2008 | Huang ................ H04L 63/065 370/254 |
| 7,461,374 B1 | 12/2008 | Balint et al. |
| 7,720,864 B1 | 5/2010 | Muth et al. |

(Continued)

FOREIGN PATENT DOCUMENTS

| | | |
|---|---|---|
| EP | 1 229 443 A2 | 8/2002 |
| WO | WO 2011078646 A1 | 6/2011 |
| WO | WO 2014200564 A1 | 12/2014 |

OTHER PUBLICATIONS

Non-final Office Action dated Sep. 22, 2016 for related U.S. Appl. No. 14/584,466.

(Continued)

*Primary Examiner* — Yonas A Bayou
(74) *Attorney, Agent, or Firm* — Vista IP Law Group, LLP

(57) ABSTRACT

A method for providing external access into a secured networked virtualization environment, includes performing a leadership election amongst nodes of the secured networked virtualization environment to elect a leader node, assigning a cluster virtual IP address to the leader node and generating a reverse tunnel, using a processor, by the leader node to allow for an external entity to communicate with the secured networked virtualization environment.

37 Claims, 14 Drawing Sheets

(56) References Cited

U.S. PATENT DOCUMENTS

| | | | |
|---|---|---|---|
| 7,934,117 B2 | 4/2011 | Kakivaya et al. | |
| 7,937,455 B2 | 5/2011 | Saha et al. | |
| 7,941,470 B2 | 5/2011 | Le et al. | |
| 7,990,962 B2 | 8/2011 | Chang et al. | |
| 8,051,252 B2 | 11/2011 | Williams | |
| 8,051,262 B2 | 11/2011 | Ichikawa et al. | |
| 8,219,769 B1 | 7/2012 | Wilk | |
| 8,392,680 B1 | 3/2013 | Natanzon et al. | |
| 8,424,003 B2 | 4/2013 | Degenaro et al. | |
| 8,473,775 B1 | 6/2013 | Helmick | |
| 8,549,518 B1 | 10/2013 | Aron | |
| 8,601,471 B2 | 12/2013 | Beaty | |
| 8,601,473 B1* | 12/2013 | Aron | G06F 9/45533 718/1 |
| 8,850,130 B1 | 9/2014 | Aron et al. | |
| 8,898,668 B1 | 11/2014 | Costea | |
| 9,009,106 B1 | 4/2015 | Aron et al. | |
| 9,032,248 B1 | 5/2015 | Petty | |
| 9,286,344 B1 | 3/2016 | Bhardwaj et al. | |
| 9,389,887 B1 | 7/2016 | Aron et al. | |
| 9,898,522 B2 | 2/2018 | Cole et al. | |
| 2002/0133491 A1* | 9/2002 | Sim | G06F 17/30067 |
| 2005/0210461 A1 | 9/2005 | Srivastava et al. | |
| 2005/0268298 A1 | 12/2005 | Hunt et al. | |
| 2006/0069912 A1 | 3/2006 | Zheng et al. | |
| 2007/0271561 A1 | 11/2007 | Winner et al. | |
| 2008/0189468 A1 | 8/2008 | Schmidt et al. | |
| 2009/0113034 A1* | 4/2009 | Krishnappa | G06F 15/16 709/223 |
| 2009/0144720 A1 | 6/2009 | Roush et al. | |
| 2009/0290572 A1 | 11/2009 | Gonia et al. | |
| 2010/0042869 A1 | 2/2010 | Szabo et al. | |
| 2010/0110150 A1 | 5/2010 | Xu et al. | |
| 2010/0162226 A1 | 6/2010 | Borissov et al. | |
| 2010/0262717 A1 | 10/2010 | Critchley | |
| 2011/0107135 A1 | 5/2011 | Andrews et al. | |
| 2011/0173493 A1 | 7/2011 | Armstrong et al. | |
| 2011/0184993 A1 | 7/2011 | Chawla | |
| 2012/0078948 A1 | 3/2012 | Darcy | |
| 2012/0117555 A1 | 5/2012 | Banerjee et al. | |
| 2012/0222089 A1* | 8/2012 | Whelan | H04B 7/18593 726/3 |
| 2012/0233608 A1 | 9/2012 | Toeroe | |
| 2012/0243795 A1 | 9/2012 | Head et al. | |
| 2012/0254342 A1 | 10/2012 | Evans | |
| 2012/0266231 A1* | 10/2012 | Spiers | H04L 63/0218 726/12 |
| 2012/0317142 A1 | 12/2012 | Broecheler et al. | |
| 2013/0007741 A1 | 1/2013 | Britsch et al. | |
| 2013/0036323 A1 | 2/2013 | Goose et al. | |
| 2013/0054973 A1* | 2/2013 | Fok | G06F 21/445 713/176 |
| 2013/0138995 A1 | 5/2013 | Sivaramakrishnan et al. | |
| 2013/0152077 A1 | 6/2013 | Leitman et al. | |
| 2013/0174246 A1* | 7/2013 | Schrecker | H04L 63/029 726/14 |
| 2013/0219030 A1 | 8/2013 | Szabo | |
| 2013/0227550 A1 | 8/2013 | Weinstein et al. | |
| 2013/0235774 A1* | 9/2013 | Jo | H04W 52/0219 370/311 |
| 2013/0304694 A1 | 11/2013 | Barreto et al. | |
| 2013/0332771 A1 | 12/2013 | Salapura et al. | |
| 2014/0052877 A1* | 2/2014 | Mao | H04L 61/103 709/245 |
| 2014/0068612 A1 | 3/2014 | Torrey | |
| 2014/0068711 A1* | 3/2014 | Schweitzer, III | G06F 21/606 726/3 |
| 2014/0089259 A1 | 3/2014 | Cheng | |
| 2014/0101649 A1 | 4/2014 | Kamble | |
| 2014/0109172 A1* | 4/2014 | Barton | H04L 63/0807 726/1 |
| 2014/0143831 A1* | 5/2014 | Fieweger | H04L 9/3231 726/3 |
| 2014/0222953 A1 | 8/2014 | Karve et al. | |
| 2015/0039763 A1 | 2/2015 | Chaudhary et al. | |
| 2015/0106325 A1 | 4/2015 | Cole et al. | |
| 2015/0205618 A1 | 7/2015 | Bailey et al. | |
| 2015/0244802 A1 | 8/2015 | Simoncelli | |
| 2015/0347775 A1 | 12/2015 | Bie et al. | |
| 2016/0034555 A1 | 2/2016 | Rahut et al. | |
| 2016/0203008 A1 | 7/2016 | Cui et al. | |
| 2016/0204977 A1 | 7/2016 | Cui et al. | |
| 2016/0359955 A1 | 12/2016 | Gill et al. | |
| 2017/0094002 A1 | 3/2017 | Kumar et al. | |

OTHER PUBLICATIONS

Citrix, "Citrix XenServer 6.0 Administrator's Guide", Copyright 2012 Citrix Systems, Inc., 207 pages.

John L Hufferd, Hufferd Enterprises, SNIA, "IP Storage Protocols: iSCSI", Copyright 2011 Storage Networking Industry Association, 46 pages.

VMware, Technical White Paper, "Multipathing Configuration for Software iSCSI Using Port Binding", Copyright 2012 Vmware, Inc., 15 pages.

International Search Report and Written Opinion dated Aug. 7, 2015, for corresponding PCT Patent Application No. PCT/US2015/030026, 10 pages.

Non-final Office Action dated Jul. 7, 2015 for related U.S. Appl. No. 14/278,363.

Non-final Office Action dated Jul. 16, 2015 for related U.S. Appl. No. 14/584,466.

International Search Report and Written Opinion dated Aug. 20, 2015, for related PCT Patent Application No. PCT/US15/31096, 8 pages.

International Search Report and Written Opinion dated Aug. 26, 2015, for related PCT Patent Application No. PCT/US15/31096, 8 pages.

Final Office Action dated Feb. 25, 2016 for related U.S. Appl. No. 14/584,466.

Final Office Action dated Mar. 23, 2016 for related U.S. Appl. No. 14/278,363.

Notice of Allowance and Fee(s) due dated Jul. 19, 2016 for related U.S. Appl. No. 14/206,869.

Lamport, Leslie "Paxos Made Simple," dated Nov. 1, 2001, 14 pages.

Alexander Shraer, et al., "Dynamic Reconfiguration of Primary/Backup Clusters," dated 2011, 13 pages.

Notice of Allowance and Fee(s) due dated Oct. 30, 2015 for related U.S. Appl. No. 14/144,520.

Wikipedia, "Compare-and-swap," Nov. 9, 2015, 6 pages.

Non-final Office Action dated Jul. 17, 2015 for related U.S. Appl. No. 14/206,869.

PCT International Search Report and Written Opinion dated Jun. 15, 2015 for related PCT Patent Application No. PCT/US2015/020139.

Final Office Action dated Jan. 25, 2016 for related U.S. Appl. No. 14/206,869.

Notice of Allowance and Fee(s) due dated Apr. 5, 2017 for related U.S. Appl. No. 14/584,466.

Ajmani et al., "Scheduling and Simulation: How to Upgrade Distributed Systems," HotOS IX: The 9th Workshop on Hot Topics in Operating Systems, USENIX, 2003, pp. 43-48.

Kochut, Andrzej and Alexei Karve, "Leveraging Local Image Redundancy for Efficient Virtual Machine Provisioning," 2012 IEEE Network Operations and Management Symposium, Jun. 8, 2012, pp. 171-178.

Soules et al.; "Metadata Efficiency in a Comprehensive Versioning File System", May 2002, CMU-CS-02-145, School of Computer Science, Carnegie Mellon University, Pittsburgh, PA 15213, 34 pages.

Non-final Office Action dated Oct. 7, 2016 for related U.S. Appl. No. 14/278,363.

Notice of Allowance and Fee(s) due dated Oct. 24, 2016 for related U.S. Appl. No. 14/206,869.

Notice of Allowance and Fee(s) due dated May 15, 2017 for related U.S. Appl. No. 15/069,961.

(56) References Cited

OTHER PUBLICATIONS

Non-Final Office Action dated Jan. 26, 2017 for related U.S. Appl. No. 15/069,961.
Non-Final Office Action dated Jul. 12, 2017 for related U.S. Appl. No. 14/610,285.
Notice of Allowance and Fee(s) due dated Apr. 10, 2017 for related U.S. Appl. No. 14/278,363.
European Search Report dated May 5, 2017 for related EP Application No. 15792334.3, 13 pages.
European Search Report dated May 19, 2017 for related EP Application No. 15788922.1, 11 pages.
Final Office Action dated Jan. 9, 2018 for related U.S. Appl. No. 14/610,285.
European Extended Search Report dated Dec. 15, 2017 for related EP Application No. 15762234.1, 16 pages.
Non-Final Office Action dated Jun. 7, 2018 for related U.S. Appl. No. 15/294,422.
Non-Final Office Action dated Jun. 29, 2018 for related U.S. Appl. No. 15/160,347.
First Office Action dated Jul. 30, 2018 for related European Application No. 15762234.1, 6 pages.
Non-Final Office Action dated Nov. 14, 2018 for related U.S. Appl. No. 15/678,893, 7 pages.
Notice of Allowance dated Nov. 20, 2018 for related U.S. Appl. No. 15/294,422, 7 pages.

\* cited by examiner

MECHANISM FOR PROVIDING EXTERNAL ACCESS TO A SECURED NETWORKED VIRTUALIZATION ENVIRONMENT

CROSS REFERENCE TO RELATED APPLICATIONS

The present application claims the benefit of U.S. Provisional Application Ser. No. 61/991,195, filed on May 9, 2014, titled "MECHANISM FOR PROVIDING EXTERNAL ACCESS TO A SECURED NETWORKED VIRTUALIZATION ENVIRONMENT", the content of the aforementioned application is hereby incorporated by reference in its entirety.

The present application is related to U.S. Pat. No. 8,601,473, entitled "ARCHITECTURE FOR MANAGING I/O AND STORAGE FOR A VIRTUALIZATION ENVIRONMENT", issued on Dec. 3, 2013, and which is hereby incorporated by reference in its entirety.

FIELD

This disclosure concerns a mechanism for providing external access to a secured networked virtualization environment.

BACKGROUND

A networked virtualization environment includes several nodes (e.g., servers, data centers, etc.) that are in communication with each other, each node hosting several user virtual machines. The networked virtualization environment, otherwise referred to as a cluster of nodes, is normally deployed for use within a secured environment, such that only internal accesses to the nodes within the cluster are allowed. In order to maintain security within the cluster of nodes, a firewall is typically provided to prevent external access into the cluster of nodes. Even where a firewall is not provided, the nodes within the cluster are provided private IP addresses such that the nodes cannot be externally accessed.

During operation of the cluster of nodes, a need may arise for an external entity to gain access into the cluster of nodes. This may occur where an external entity is needed to service or provide support to the cluster of nodes. Because the cluster of nodes are protected by a firewall or otherwise inaccessible to external entities, a mechanism is needed for providing external access to the secured networked virtualization environment (e.g., cluster of nodes).

SUMMARY OF THE INVENTION

Embodiments of the present invention provide a mechanism for providing external access to a secured networked virtualization environment. The method for providing external access to a secured networked virtualization environment includes performing a leadership election amongst nodes of the secured networked virtualization environment to elect a leader node, assigning a cluster virtual IP address to the leader node and generating a reverse tunnel, using a processor, by the leader node to allow for an external entity to communicate with the secured networked virtualization environment.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect of or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

Figure 1:
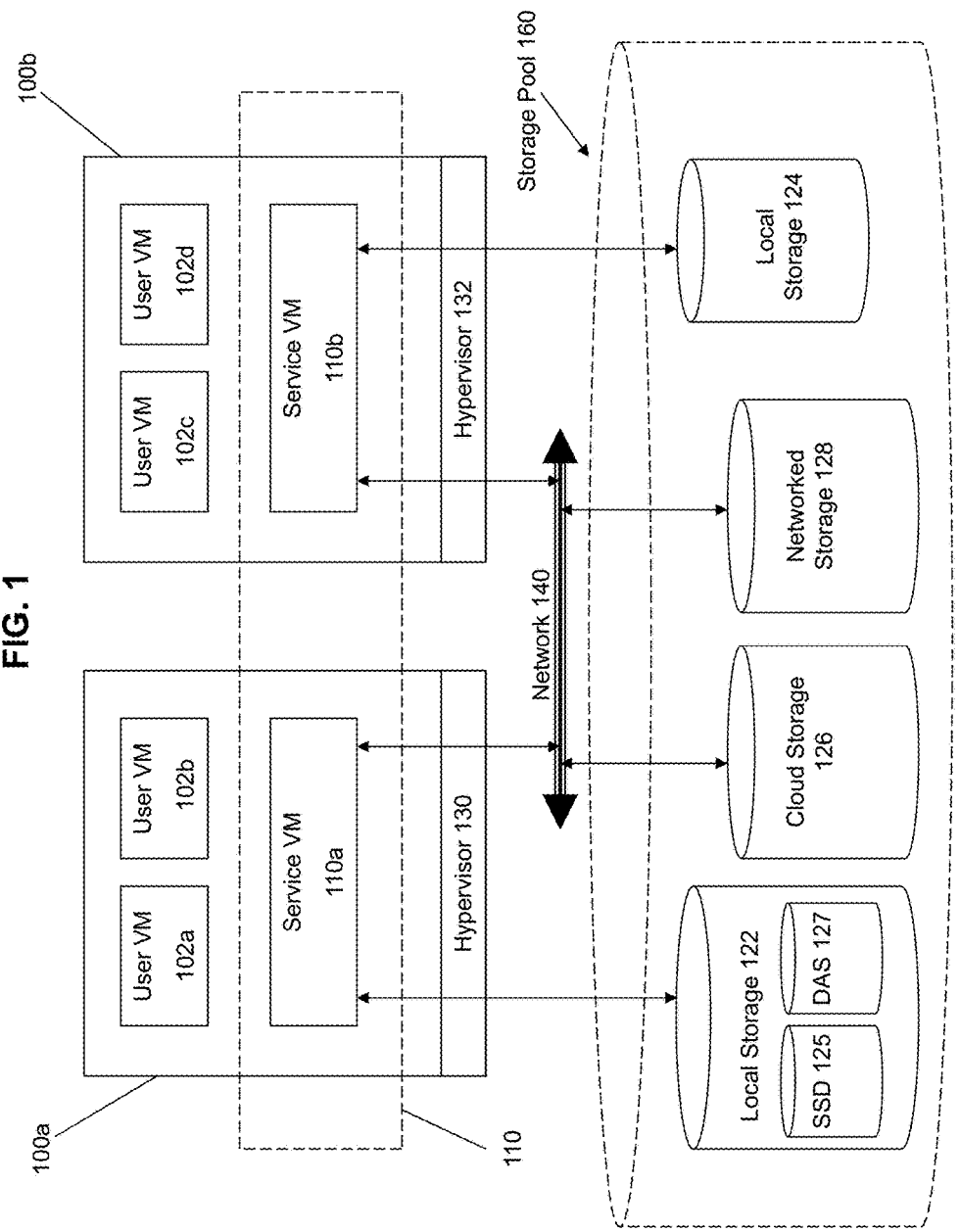
FIG. 1 illustrates a networked virtualization environment for storage management according to some embodiments.

FIG. 1 illustrates a networked virtualization environment for storage management according to some embodiments of the invention. The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structure from the storage devices in the storage pool 160. As used herein, the term vDisk refers to the storage abstraction that is exposed by a Service/Controller VM to be used by a user VM. In some embodiments, the vDisk is exposed via iSCSI ("internet small computer system interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM". The term Service VM may also be referred to herein as a Controller VM. This is the "Storage Controller" in the currently described networked virtualization environment for storage management. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption and compression. The networked virtualization environment massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in related U.S. Pat. No. 8,601,473, issued on Dec. 3, 2013, entitled "Architecture for Managing I/O and Storage for a Virtualization Environment", which is hereby incorporated by reference in its entirety.

A networked virtualization environment includes several nodes (e.g., servers, data centers, etc.) that are in communication with each other, each node hosting several user virtual machines. An example of such a networked virtualization environment is illustrated in FIG. 1. The networked virtualization environment, otherwise referred to as a cluster of nodes, is normally deployed for use within a secured environment, such that only internal accesses to the nodes within the cluster are allowed. In order to maintain security within the cluster of nodes, a firewall is typically provided to prevent external access into the cluster of nodes. Even where a firewall is not provided, the nodes within the cluster are provided private IP addresses such that the nodes cannot be externally accessed.

Figure 2:
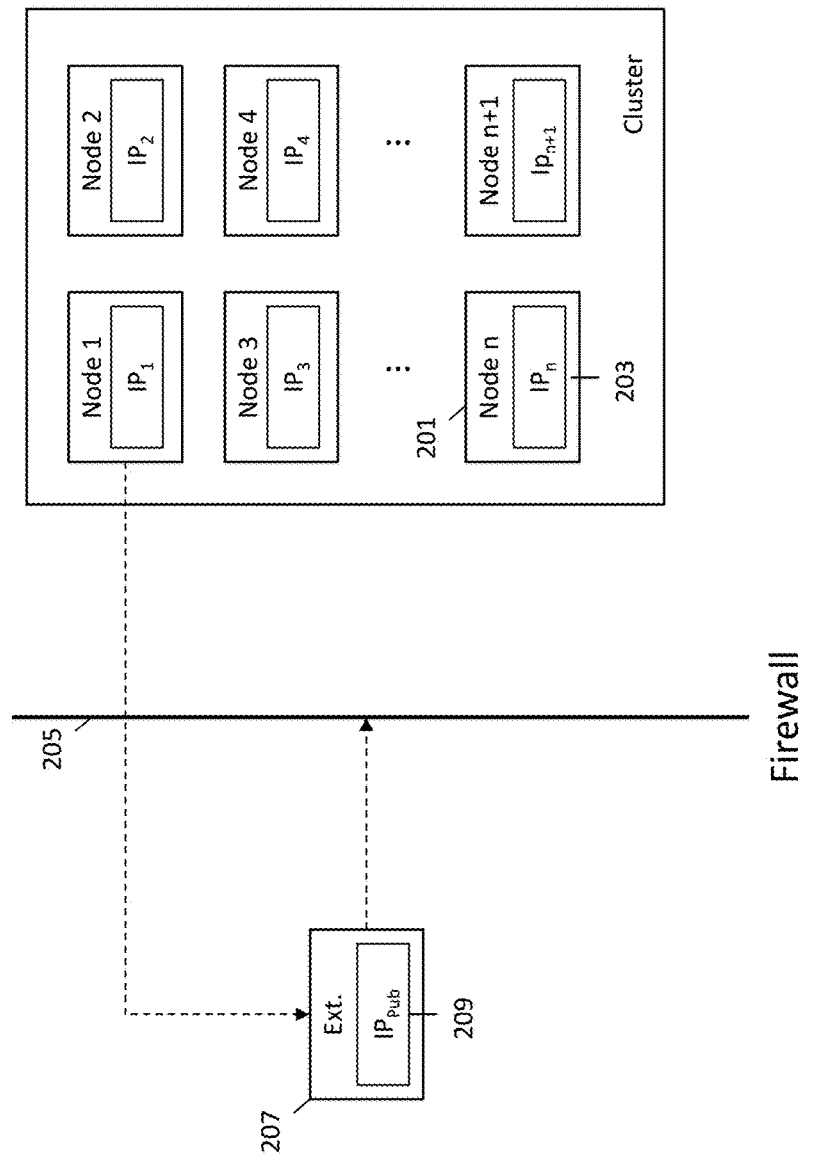
FIG. 2 is schematic diagram illustrating the prevention of external access to a secured networked virtualization environment.

FIG. 2 is schematic diagram illustrating the prevention of external access to a secured networked virtualization environment. FIG. 2 illustrates an external entity 207 with a public IP address 209 and a cluster of nodes (i.e., networked virtualization environment), where each node is associated with a private IP address 203. A firewall 205 is provided between the external entity and the cluster of nodes 201 to prevent access to the cluster of nodes by the external entity.

By providing each node 201 within the cluster with a private IP address 203, internal communications between nodes 201 located in the cluster is allowed while external access to nodes 201 within the cluster is prevented because the external entity 207 is unable to access the private IP address 203 of the nodes 201 within the cluster. While the external entity 207 is prevented from accessing the nodes within the cluster, the nodes 201 within the cluster are allowed to communicate with the external entity 207 by way of the external entity's public IP address 209.

An additional layer of protection is also provided by the firewall 205. The firewall allows for nodes 201 within the cluster to communicate with the external entity 207, but prevents the external entity 207 from being able to access nodes 201 within the cluster, as illustrated by the unidirectional dashed arrows in FIG. 2.

During operation of the cluster of nodes, a need may arise for the external entity 207 to gain access into nodes 201 within the cluster. This may occur where the external entity 207 is needed to service or provide support to nodes 201 within the cluster. Because the nodes 201 within the cluster are protected by a firewall or otherwise inaccessible to external entities (e.g., due to their private IP addresses), a mechanism is needed for providing external access to the secured networked virtualization environment (e.g., cluster of nodes).

Figure 3:
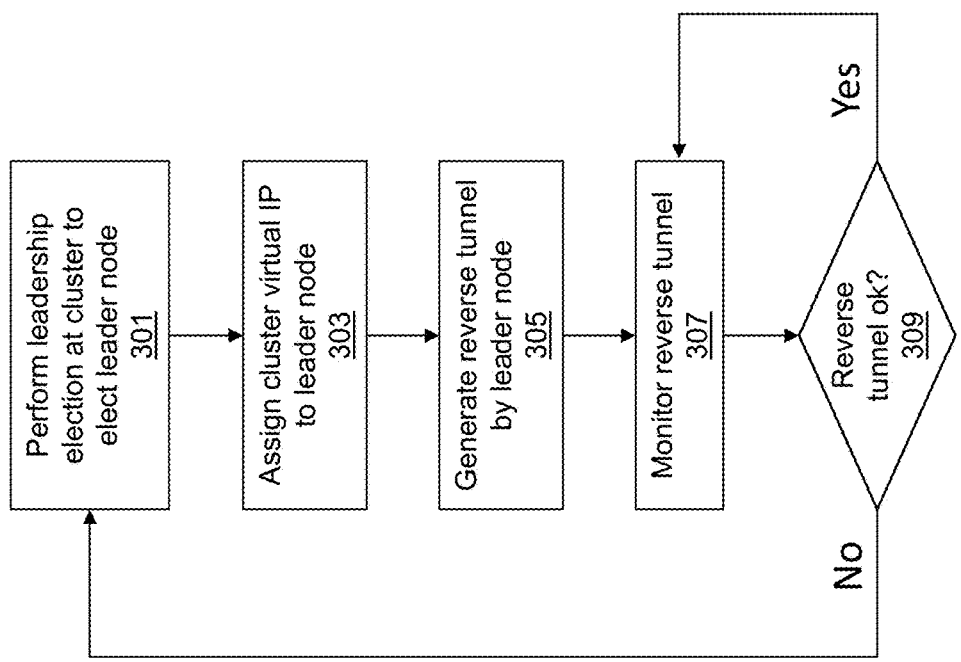
FIG. 3 is a flow diagram illustrating a method for providing external access to a secured networked virtualization environment according to some embodiments.

FIG. 3 is a flow diagram illustrating a method for providing external access to a secured networked virtualization environment according to some embodiments. The method of FIG. 3 provides for a single point of external access into the secured networked virtualization environment (e.g., cluster of nodes). This allows for nodes within the cluster to be accessed by an external entity through the single access point rather than requiring each individual node within the cluster to independently provide for external access.

Initially a leadership election is performed by the secured networked virtualization environment (e.g., cluster of nodes) to elect a leader node as shown at 301. The leader node will be responsible for providing external access to the cluster of nodes, and will also be utilized to direct the external communications from external entities to the appropriate nodes within the cluster. By electing a leader node, a single point of external access is provided for the cluster, rather than having each node within the cluster independently provide for external access. This allows for external entities looking to service or provide support to the cluster of nodes to communicate through a single end-point rather than having to separately communicate through multiple different endpoints, thereby streamlining the process for providing external access.

Figure 4:
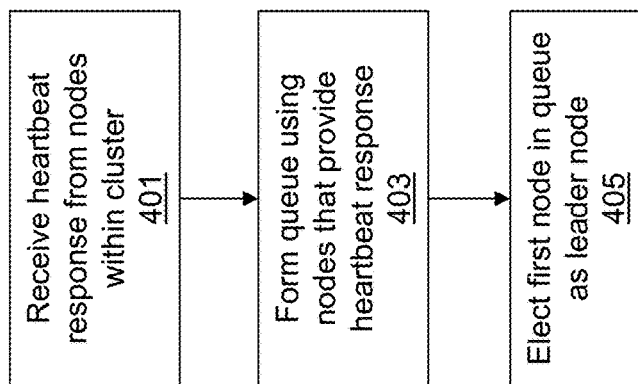
FIG. 4 is a flow diagram illustrating a method for performing leadership election at the secured networked virtualization environment to provide access to the secured networked virtualization environment according to some embodiments.

Various methods for leadership election exist for electing a leader node from the cluster of nodes. An example of a leadership election is described in FIG. 4. FIG. 4 is a flow diagram illustrating a method for performing leadership election at the secured networked virtualization environment to provide access to the secured networked virtualization environment according to some embodiments.

In the networked virtualization environment (e.g., cluster of nodes), a distributed configuration module may exist at each node. The distributed configuration module keeps track of various parameters related to the networked virtualization environment, including the health of nodes within the cluster. Each node may utilize its own instance of the distributed configuration modules, and the different distributed configuration modules may communicate amongst each other to track parameters for all nodes with the cluster.

One feature provided by the distributed configuration modules is heartbeat tracking. Each node may receive a request from its corresponding distributed configuration module requesting its health status. The node may respond with an indication of good health, or otherwise not respond, which indicates that it is in a failure state. The distributed configuration modules within the cluster may communicate amongst each other such that every node is aware of the health of every other node in the networked virtualization environment.

When leadership election is to occur for the cluster of nodes, the distributed configuration modules may receive heartbeat responses from their corresponding nodes as shown at 401. For the nodes that do provide heartbeat responses, a queue may be formed as shown at 403. This may be accomplished by placing the first node that provides a heartbeat response at the head of the queue, and placing each subsequent node that provides a heartbeat response in a respective location within the queue. The distributed configuration modules at each node may communicate amongst each other to determine the order of nodes within the queue.

The queue may be updated periodically, such as for each heartbeat request and heartbeat response. When a node currently located in the queue subsequently fails to provide a heartbeat response, it may be removed from the queue. Likewise, when a node that is not currently located in the queue subsequently provides a healthy heartbeat response, it is placed in the appropriate position in the queue.

After the queue is formed using nodes that provide a heartbeat response, the node located in the first position in the queue is elected as the leader node as shown at 405. As mentioned above, the elected leader node will be responsible for providing external access to the cluster of nodes, and will also be utilized to direct the external communications from external entities to the appropriate nodes within the cluster.

Once the leader node has been elected, a cluster virtual IP address is assigned to the leader node as shown at 303. By assigning a cluster virtual IP address to the leader node, a single IP address may be utilized for all external accesses into the cluster of nodes. Whenever the leader node fails, and a new leader node is elected, the new leader node may be assigned the same cluster virtual IP address such that external communication with the cluster through the new leader node may still be accomplished using the same cluster virtual IP address. This avoids the need to provide a different IP address each time a different leader node is elected for the cluster, thereby simplifying the process for providing external access to the cluster.

The nodes within the cluster may continue to communicate internally amongst each other using their individual private IP addresses. The cluster virtual IP address is only used to allow for external communication from an external entity into the cluster of nodes that utilizes.

After the leader node has been assigned the cluster virtual IP address, the leader node generates a reverse tunnel to allow for the external entity to communicate with the cluster as shown at 305. In order to generate a reverse tunnel, the leader node may first identify a port number at an external entity through which the external entity may communicate with the leader node. In some embodiments, the leader node may use a statically determined port (e.g., statically determined port number) at the external entity. In other embodiments, the leader node may use dynamically determined port (e.g., dynamically determined port number) at the external entity.

The external entity may be selected from a configured list of external entities assigned to and stored at the cluster of nodes. The configured list of external entities may be stored within the secured networked virtualization environment to allow for the secured networked virtualization environment to identify the external entity for providing external access. In some embodiments, the external entity is identified based on its ability to establish communication with the secured networked virtualization environment. For example, the external entity may be determined by iterating through the configured list of external entities until an external entity is encountered with which communication can be established and port numbers determined. This list of external entities may be periodically refreshed by communicating with an entity from the current list. For example, the list of external entities may be refreshed once daily. This allows for the configured list of external entities to be modified (e.g., new external entities added) without requiring a manual reset or a software package upgrade. Additionally, to enable load balancing different clusters may be assigned different lists of external entities based on their unique identifiers. Thus the reverse tunnels established across different clusters may be distributed among different external entities.

Figure 5:
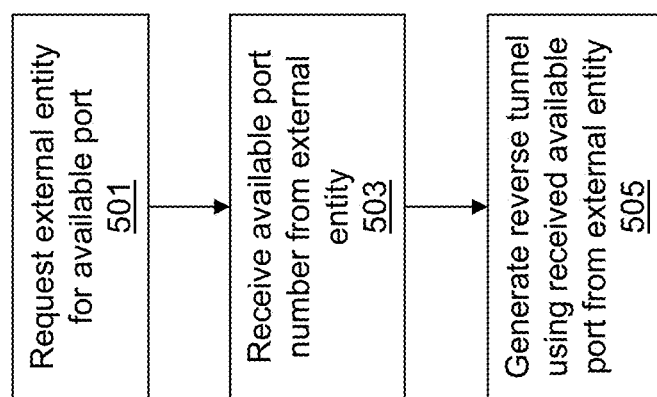
FIG. 5 is a flow diagram illustrating a method for dynamically providing external access to the secured networked virtualization environment according to some embodiments.

FIG. 5 is a flow diagram illustrating a method for dynamic port generation for providing external access to the secured networked virtualization environment according to some embodiments. Initially, the leader node requests the external entity for an available port number as shown at 501. The external entity may then examine its port availability to identify an available port to be used for accessing the cluster of nodes. Once the external entity identifies an available port to be used for accessing the cluster of nodes, it responds to the cluster's request by providing the available port number. At the same time, the external entity associates the port number with the requesting cluster. This is done so that the same port number may be assigned to the cluster where the leader node dies, a new leader node is elected, and the new leader is used to generate another reverse tunnel to the external entity to provide the external entity access to the cluster of nodes.

The leader node receives the available port number from the external entity as shown at 503 and then generates the reverse tunnel using the received available port number from the external entity as shown at 505, which will be discussed in greater detail below. By providing for dynamic port generation, the port utilized by the external entity for access into the secured cluster of nodes may be determined based on availability rather than having to statically provide a port for external access.

After identifying a port number at the external entity through which the external entity may communicate with the leader node (either statically or dynamically), the leader node may then perform a secured shell (SSH) command with the identified port number, the cluster virtual IP, and a public SSH key for the external entity. The command is performed by the leader node causing a tunnel to be created between the external entity and the leader node through which the external entity may communicate with the cluster. The external entity then communicates with the cluster via the tunnel formed between the external entity and the leader node.

The reverse tunnel is monitored at the cluster as shown at 307. While monitoring the reverse tunnel, the cluster may periodically check to see if the reverse tunnel remains operational as shown at 309. If the reverse tunnel becomes non-operational, the method returns to 301 where a new leader node is elected and another reverse tunnel is generated, which will be described in greater detail below. In some embodiments, the reverse tunnel may become non-operational when the leader node fails.

If the reverse tunnel remains operational, the method may return to 307 where the cluster continues to monitor the reverse tunnel. If the cluster of nodes decides that it no longer wants to provide access to external entities, it may terminate the reverse tunnel as shown at 311.

Figure 6A:
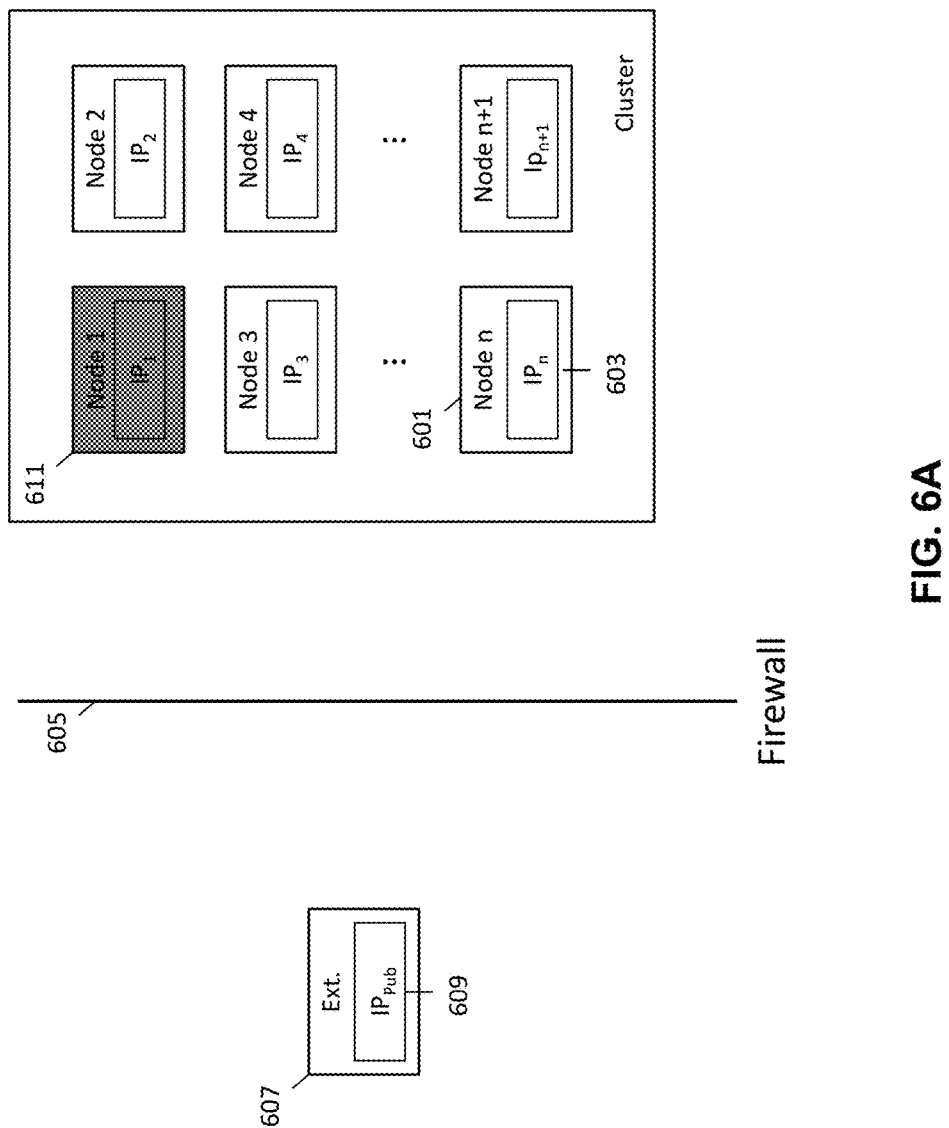
FIGS. 6A to 6C are schematic diagrams illustrating a method for providing external access to a secured networked virtualization environment according to some embodiments.
Figure 6B:
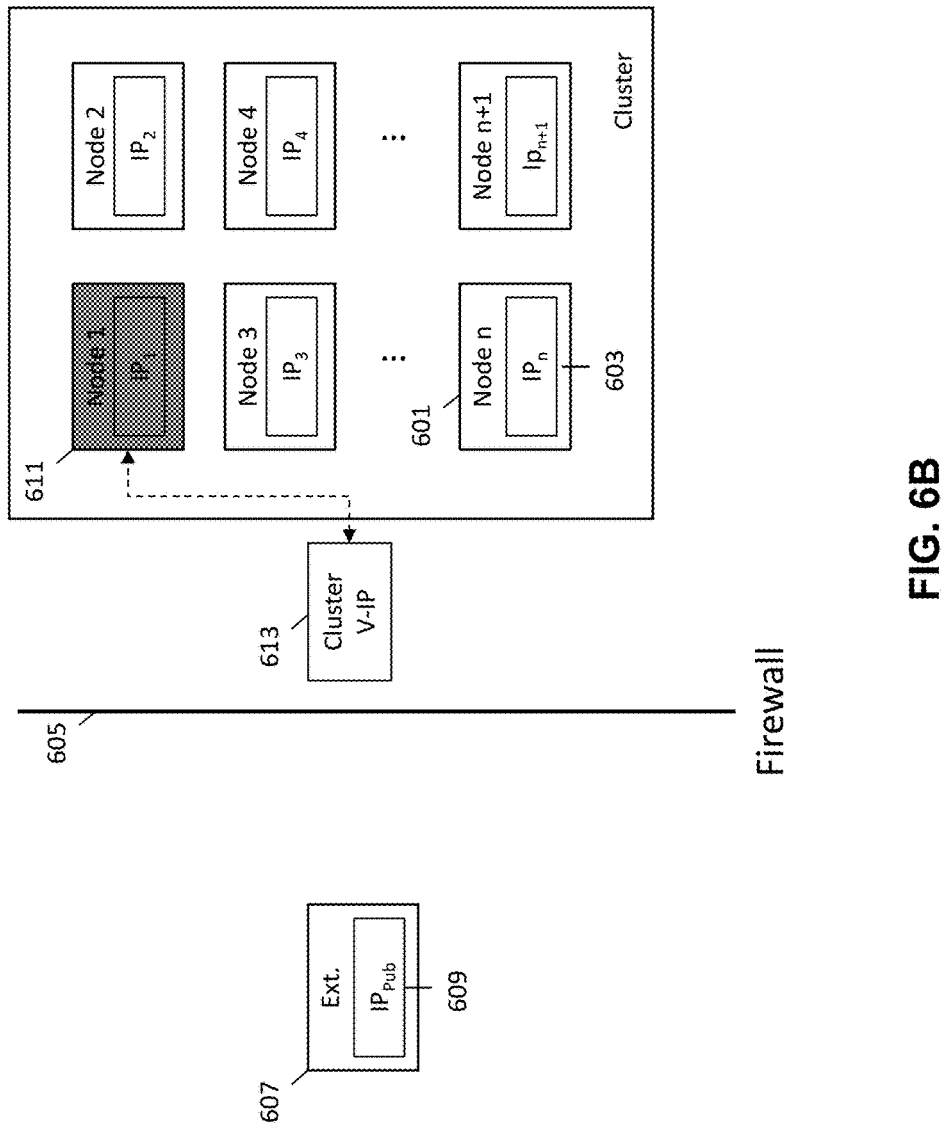
Figure 6C:
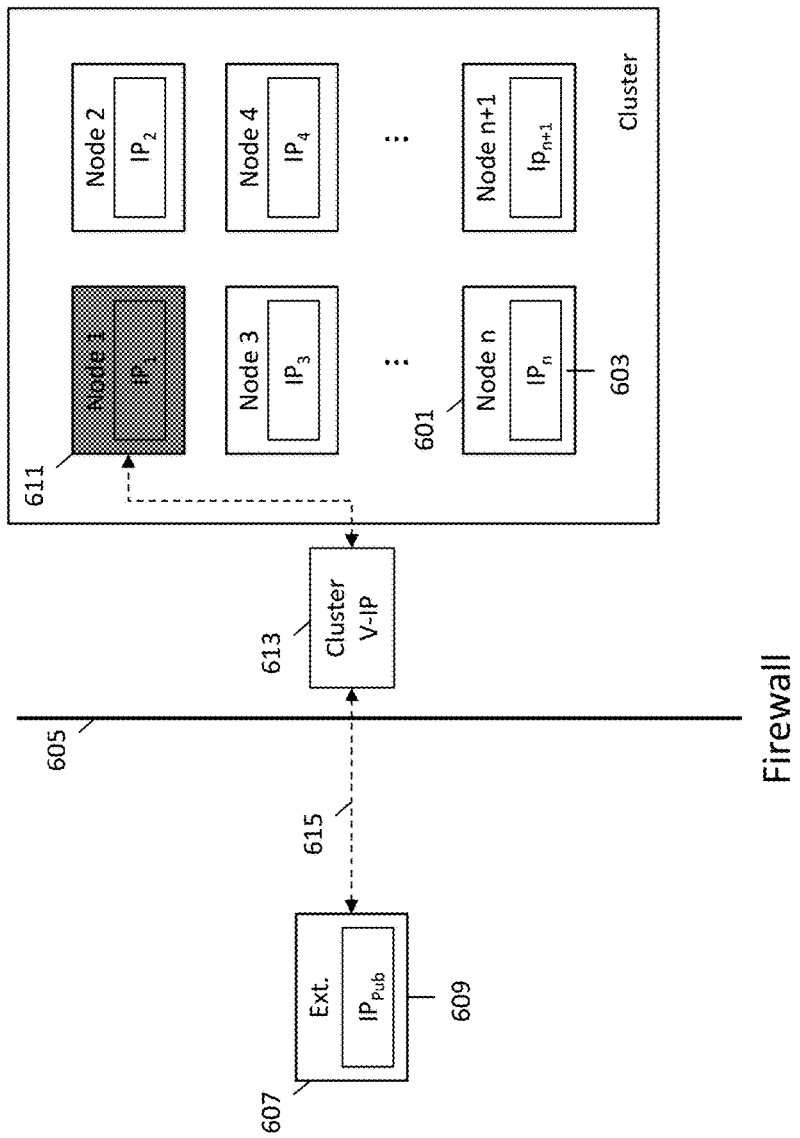

FIGS. 6A-6C are schematic diagrams illustrating a method for providing external access to a secured networked virtualization environment according to some embodiments. FIG. 6A-6C illustrate an external entity 607 with a public IP address 609 and a cluster of nodes (i.e., networked virtualization environment), where each node 601 is associated with a private IP address 603. A firewall 605 is provided between the external entity 607 and the cluster of nodes 601 to prevent access to the cluster of nodes 601 by the external entity 607.

As mentioned above, the external entity 607 may be selected from a configured list of external entities assigned to and stored at the cluster of nodes 611. The external entity that is provided with access to the cluster of nodes 601 may be determined by iterating through the configured list of external entities until the external entity 607 is encountered with which communication can be established and port numbers determined.

A leadership election is then performed by the secured networked virtualization environment (e.g., cluster of nodes) to elect a leader node 611 as illustrated in FIG. 6A. In FIG. 6A, node 1 of the cluster is elected as the leader node 611. The leadership election may be performed at the cluster in accordance with the method described in FIG. 4. However, it is important to note that various other leadership election schemes may be used to determine the leader node for the cluster.

The leader node 611 is responsible for providing external access to the cluster of nodes 601, and will also be utilized to direct the external communications from the external entity 607 to the appropriate nodes 601 within the cluster. By electing a leader node 611, a single point of external access is provided for the cluster, rather than having each node 601 within the cluster independently provide for external access. This allows for the external entity 607 looking to service or provide support to the cluster of nodes 601 to communicate through a single end-point rather than having to separately communicate through multiple different endpoints, thereby streamlining the process for providing external access.

Once the leader node 611 has been elected, a cluster virtual IP address 613 is assigned to the leader node 611 as illustrated in FIG. 6B. By assigning a cluster virtual IP address 613 to the leader node 611, a single IP address may be utilized for all external accesses into the cluster of nodes 601. Whenever the leader node 611 fails, and a new leader node is elected, the new leader node may be assigned the same cluster virtual IP address 613 such that external communication with the cluster through the new leader node may still be accomplished using the same cluster virtual IP address 613. This avoids the need to provide a different IP address each time a different leader node is elected for the cluster, thereby simplifying the process for providing external access to the cluster.

The nodes 601 within the cluster may continue to communicate internally amongst each other using their individual private IP addresses 603. The cluster virtual IP address 613 is only used to allow for external communication from the external entity 607 into the cluster of nodes 601.

After the leader node 611 has been assigned the cluster virtual IP address 613, the leader node 611 generates a reverse tunnel 615 to allow for the external entity 607 to communicate with the cluster as illustrated in FIG. 6C by the dashed arrows between the external entity 607 and the cluster virtual IP address 613. The reverse tunnel 615 may be generated by the leader node 611 in accordance with the methods described above in FIGS. 3 and 5.

Monitoring of the reverse tunnel 615 may then occur until the leader node 611 fails or the cluster otherwise decides to terminate the reverse tunnel 615 and discontinue external access. When the leader node 611 fails, external access from the external entity 607 into the cluster of nodes 601 is not lost. The cluster of nodes 601 may perform another leadership election to again generate a reverse tunnel for allowing the external entity to access the cluster of nodes.

Figure 7:
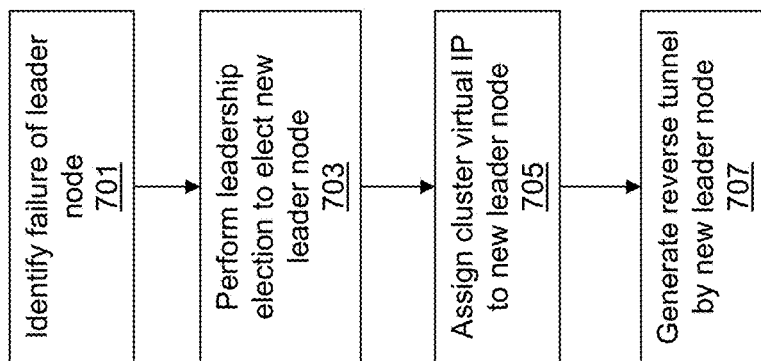
FIG. 7 is a flow diagram illustrating a method for providing external access to the secured networked virtualization environment upon failure of the leader node in the secured networked virtualization environment according to some embodiments.

FIG. 7 is a flow diagram illustrating a method for providing external access to the secured networked virtualization environment upon failure of the leader node in the secured networked virtualization environment according to some embodiments.

Initially, failure of the leader node is identified as shown at 701. As mentioned above, an instance of a distributed configuration module at each node keeps track of the health of nodes within the cluster. When the leader node fails to provide a heartbeat in response to a heartbeat request from its corresponding distributed configuration module, notification that the leader node has failed is propagated to the rest of the nodes in the cluster.

After identifying that the leader node has failed, leadership election is again performed to elect a new leader node as shown at 703. Election of the new leader node may occur in the same manner as election of failed leader node and as described above in FIG. 4. Alternatively, other leadership election schemes may be used to elect the new leader node. When leadership election is performed in the same manner as described above in FIG. 4, the next node in the queue may be elected as the new leader node. The elected new leader node will replace the failed leader node and take on the responsibility of providing external access to the cluster of nodes and directing external communications from external entities to the appropriate nodes within the cluster.

Once the new leader node has been elected, the cluster virtual IP address that was previously assigned to the failed leader node is assigned to the new leader node as shown at 705. By assigning the previously assigned cluster virtual IP address to the new leader node, external communication with the cluster through the new leader node may still be accomplished using the same cluster virtual IP address. This avoids the need to provide a different IP address each time a different leader node is elected for the cluster, thereby simplifying the process for providing external access to the cluster.

The nodes within the cluster may continue to communicate internally amongst each other using their individual private IP addresses. The cluster virtual IP address is only used to allow for external communication from an external entity into the cluster of nodes that utilizes.

After the new leader node has been assigned the cluster virtual IP address, the new leader node generates a reverse tunnel to allow for the external entity to communicate with the cluster as shown at 707. Because the previously elected leader node has failed, the reverse tunnel generated by the previously elected leader node is no longer operational. Thus, the newly elected leader node must generate another reverse tunnel to allow for external entities to communicate with the cluster. The newly elected leader node may generate the reverse tunnel in the same manner as described above for the previously elected leader node.

Because the newly elected leader node utilizes the same cluster virtual IP address as the previously elected leader node, the reverse tunnel generated by the newly elected leader node will utilize the same cluster virtual IP address as the reverse tunnel generated by the previously elected leader node. Similarly, because the newly elected leader node belongs to the same cluster as the previously elected leader node, the port number at the external entity through which the external entity may communicate with the newly elected leader node may remain the same as the port number used in conjunction with the previously elected leader node.

After the newly elected leader node has generated the reverse tunnel for allowing the external entity to communicate with the cluster, monitoring may continue to occur in the manner described above.

FIGS. 8A-8D are schematic diagrams illustrating a method for providing external access to the secured networked virtualization environment upon failure of the leader node in the secured networked virtualization environment according to some embodiments. FIGS. 8A-8D illustrate the failure of the leader node from the arrangement depicted in FIGS. 6A-6C.

Figure 8A:
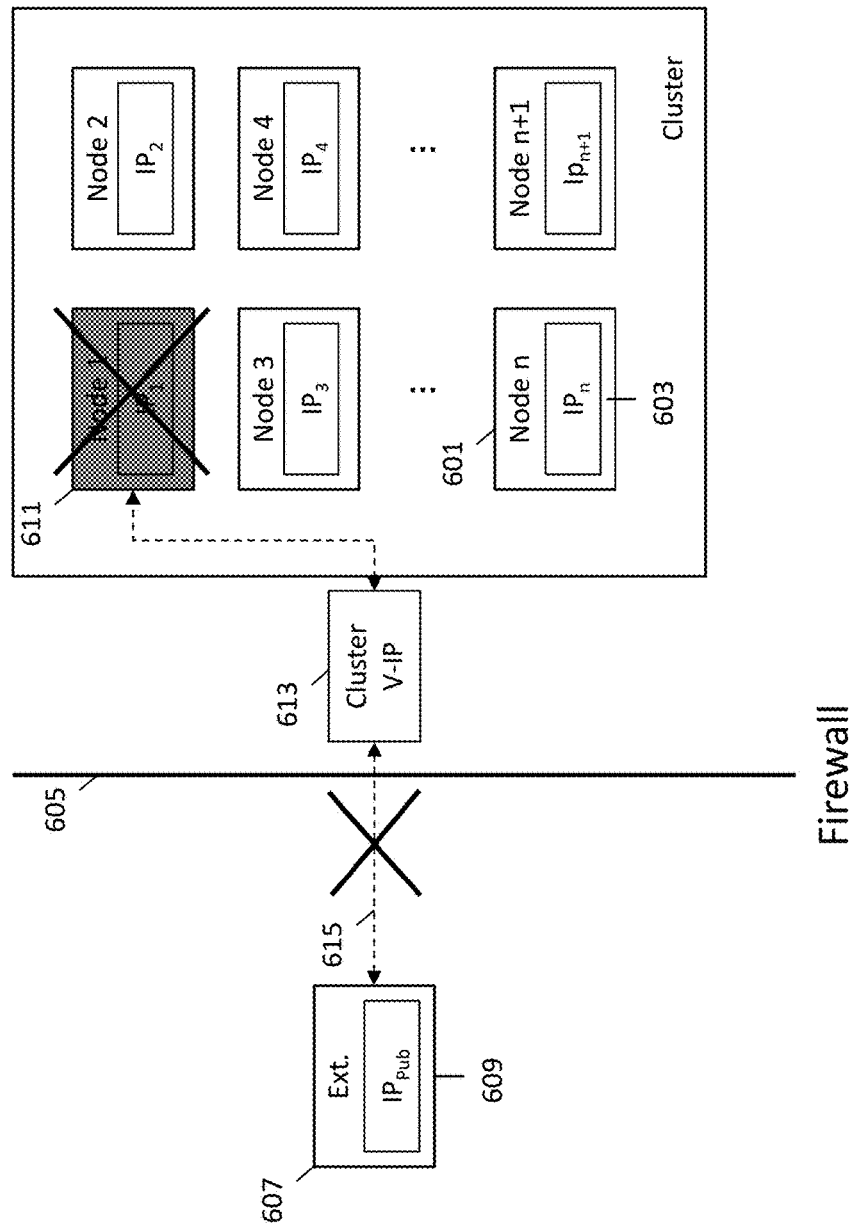
FIGS. 8A-8D are schematic diagrams illustrating a method for providing external access to the secured networked virtualization environment upon failure of the leader node in the secured networked virtualization environment according to some embodiments.

In FIG. 8A, the leader node 611 fails and the reverse tunnel generated (e.g., cluster virtual IP address 613) by the leader node is no longer operational. The failure of the leader node 611 is identified in the manner described above in FIG. 7.

Figure 8B:
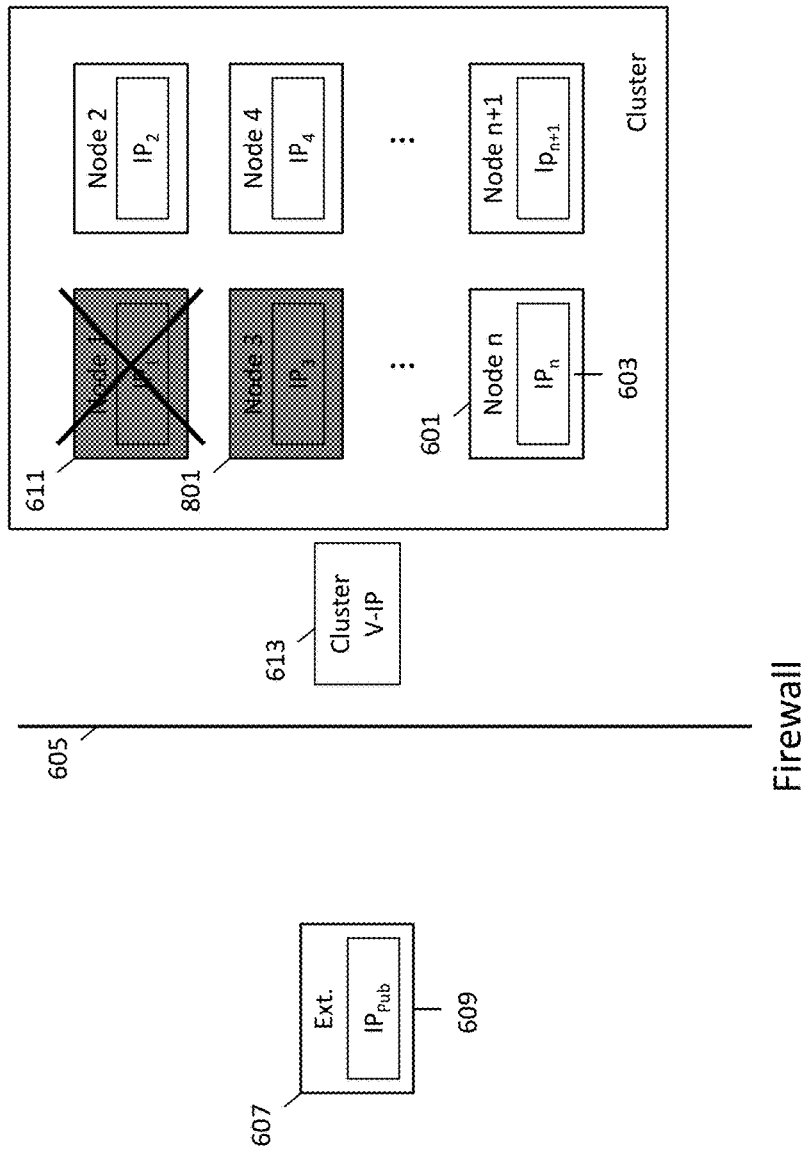

After identifying that the leader node 611 has failed, leadership election is again performed to elect a new leader node 801 (node 3) as illustrated in FIG. 8B. Election of the new leader node 801 may occur in the same manner as election of failed leader node 611 and as described above in FIG. 4. Alternatively, other leadership election schemes may be used to elect the new leader node 801. The newly elected leader node 801 will replace the failed leader node 611 and take on the responsibility of providing external access to the cluster of nodes and directing external communications from the external entity 607 to the appropriate nodes 601 within the cluster.

Figure 8C:
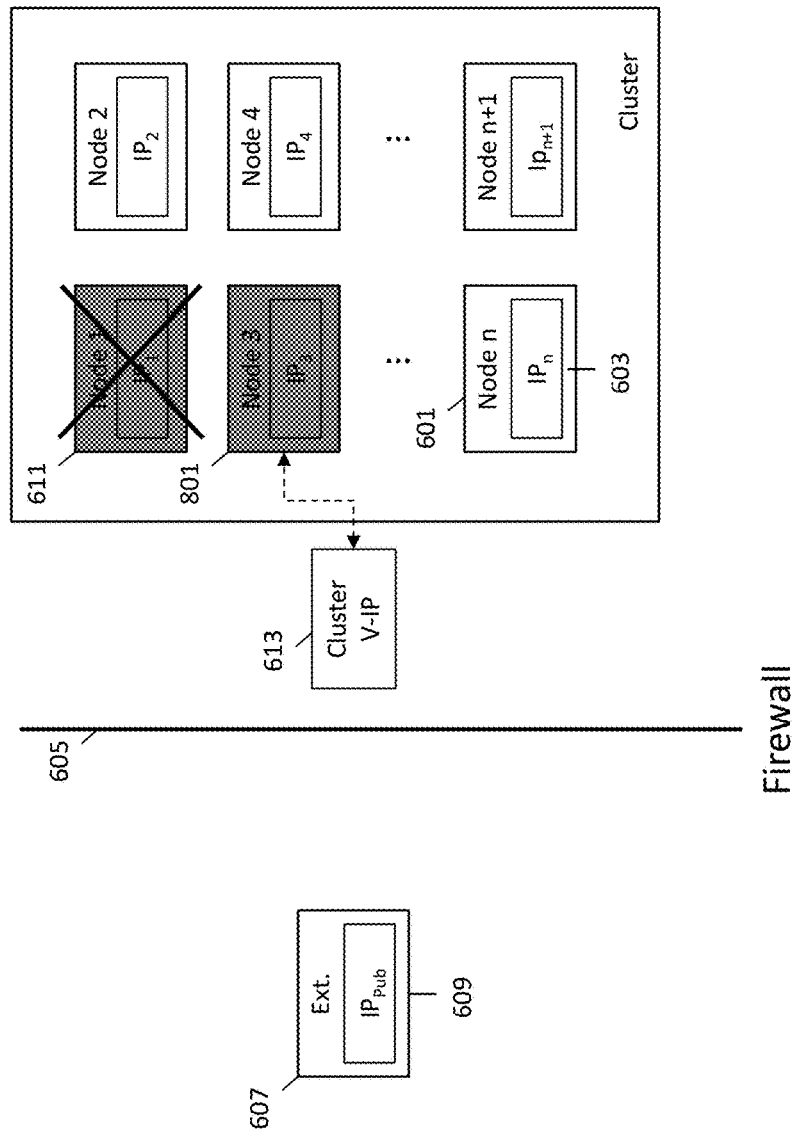

The cluster virtual IP address 613 that was previously assigned to the failed leader node 611 is then assigned to the new leader node 801 as illustrated in FIG. 8C. By assigning the previously assigned cluster virtual IP address 613 to the new leader node 801, external communication with the cluster through the new leader node 801 may still be accomplished using the same cluster virtual IP address 613. This avoids the need to provide a different IP address each time a different leader node is elected for the cluster, thereby simplifying the process for providing external access to the cluster.

Figure 8D:
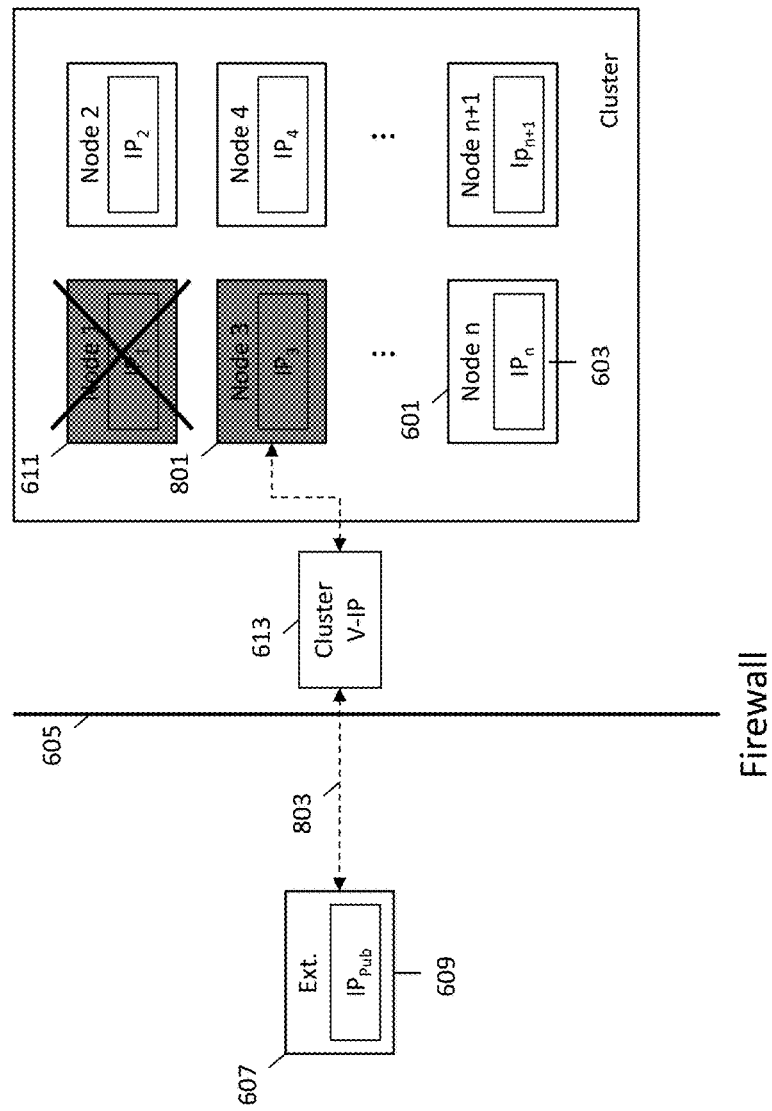

Finally, the new leader node 801 generates another reverse tunnel 803 to allow for the external entity 607 to communicate with the cluster as illustrated in FIG. 8D and as depicted by the dashed arrows between the external entity 607 and the cluster virtual IP address 613. Because the previously elected leader node 611 has failed, the reverse tunnel 615 generated by the previously elected leader node 611 is no longer operational. Thus, the newly elected leader node 801 must generate another reverse tunnel 803 to allow for the external entity 607 to communicate with the cluster. The newly elected leader node 801 may generate the reverse tunnel 803 in the same manner as described above for the previously elected leader node 611.

Because the newly elected leader node 801 utilizes the same cluster virtual IP address 613 as the previously elected leader node 611, the reverse tunnel 803 generated by the newly elected leader node 801 will utilize the same cluster virtual IP address 613 as the reverse tunnel generated 615 by the previously elected leader node 611. Similarly, because the newly elected leader node 801 belongs to the same cluster as the previously elected leader node 611, the port number at the external entity through which the external entity 607 may communicate with the newly elected leader node 801 may remain the same as the port number used in conjunction with the previously elected leader node 611.

After the newly elected leader node 801 has generated the reverse tunnel 803 for allowing the external entity 607 to communicate with the cluster, monitoring may continue to occur in the manner described above.

System Architecture

Figure 9:
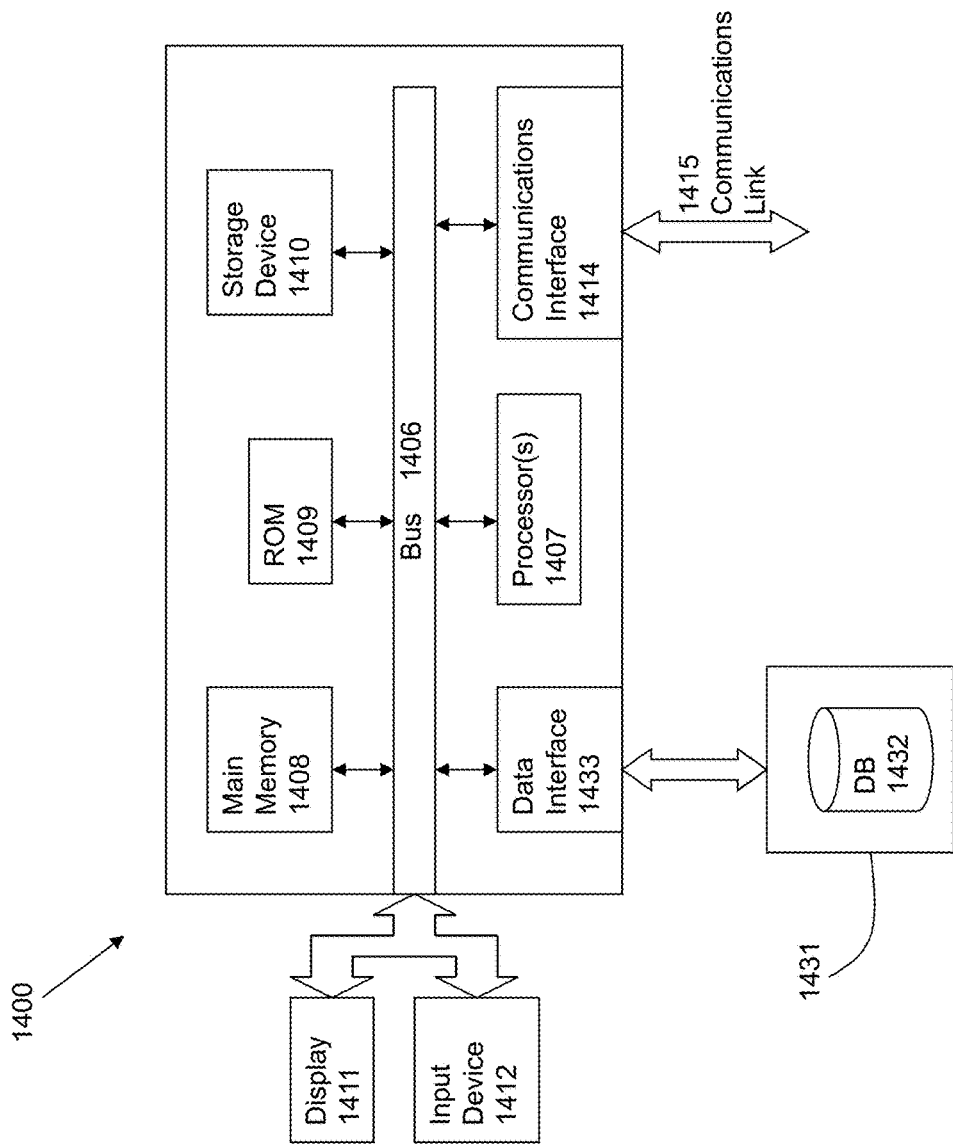
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for providing external access into a secured networked virtualization environment, comprising:
    performing a leadership election amongst nodes of the secured networked virtualization environment that elects a leader node that directs external communication from an external entity to one or more nodes within the secured networked virtualization environment;
    assigning a cluster virtual IP address to the leader node, wherein the cluster virtual IP address is a different IP address than an IP address of the leader node;
    generating a reverse tunnel, using a processor of the leader node, based at least in part on the cluster virtual IP address, wherein the external communication from the external entity into the one or more nodes within the secured networked virtualization environment is sent via the reverse tunnel associated with the cluster virtual IP address;
    identifying failure of the leader node;
    performing the leadership election amongst the nodes of the secured networked virtualization environment to elect a new leader node;
    assigning the cluster virtual IP address to the new leader node; and
    generating another reverse tunnel by the new leader node to allow the external entity to communicate with the secured networked virtualization environment.

2. The method of claim 1, wherein performing the leadership election, comprises:
    receiving heartbeat responses for the nodes of the secured networked virtualization environment;
    forming a queue with the nodes that provide heartbeat responses, wherein the nodes that provide heartbeat responses are placed in the queue in an order that the nodes provide their heartbeat responses; and
    electing a first node in the queue as the leader node.

3. The method of claim 2, wherein a node located in the queue that subsequently fails to provide a heartbeat response is removed from the queue.

4. The method of claim 2, wherein a node not located in the queue that subsequently provides a heartbeat response is placed in an appropriate position in the queue.

5. The method of claim 1, wherein each node of the secured networked virtualization environment has a private IP address and internal communication amongst the nodes of the secured networked virtualization environment is made through private IP addresses.

6. The method of claim 1, wherein generating the reverse tunnel comprises:
identifying, by the leader node, a port number at the external entity through which the external entity communicates with the leader node.

7. The method of claim 6, wherein the port number is a statically determined port number.

8. The method of claim 6, wherein the port number is a dynamically determined port number.

9. The method of claim 8, wherein the dynamically determined port number is determined by:
requesting the external entity for an available port number;
receiving the available port number from the external entity; and
utilizing the available port number as the port number at the external entity through which the external entity communicates with the leader node.

10. The method of claim 6, wherein the port number at the external entity through which the external entity communicates with the leader node is associated with the secured networked virtualization environment.

11. The method of claim 6, wherein generating the reverse tunnel comprises performing a secured shell (SSH) command using the port number, the cluster virtual IP address and a public SSH key for the external entity.

12. The method of claim 1, wherein the external entity is chosen by iterating over a list of external entities associated with the secured networked virtualization environment until the external entity is identified.

13. The method of claim 12, wherein the external entity is identified based on its ability to establish communication with the secured networked virtualization environment.

14. The method of claim 12, wherein the list of external entities is updated periodically.

15. The method of claim 14, wherein the list of external entities is updated by:
requesting a current external entity from the list of external entities for an updated list of external entities;
receiving the updated list of external entities; and
modifying the list of external entities associated with the secured networked virtualization environment with the updated list of external entities.

16. The method of claim 12, wherein the list of external entities associated with the secured networked virtualization environment is assigned to the secured networked virtualization environment based on a unique identifier for the secured networked virtualization environment.

17. A computer program product embodied on a non-transitory computer readable medium, the non-transitory computer readable medium having stored thereon a sequence of instructions which, when executed by a processor causes the processor to execute a method for providing external access into a secured networked virtualization environment, comprising:
performing a leadership election amongst nodes of the secured networked virtualization environment that elects a leader node that directs external communication from an external entity to one or more nodes within the secured networked virtualization environment;
assigning a cluster virtual IP address to the leader node, wherein the cluster virtual IP address is a different IP address than an IP address of the leader node;
generating a reverse tunnel, using a processor of the leader node, based at least in part on the cluster virtual IP address, wherein the external communication from the external entity into the one or more nodes within the secured networked virtualization environment is sent via the reverse tunnel associated with the cluster virtual IP address;
identifying failure of the leader node;
performing the leadership election amongst the nodes of the secured networked virtualization environment to elect a new leader node;
assigning the cluster virtual IP address to the new leader node; and
generating another reverse tunnel by the new leader node to allow the external entity to communicate with the secured networked virtualization environment.

18. The computer program product of claim 17, wherein performing the leadership election, comprises:
receiving heartbeat responses for the nodes of the secured networked virtualization environment;
forming a queue with the nodes that provide heartbeat responses, wherein the nodes that provide heartbeat responses are placed in the queue in an order that the nodes provide their heartbeat responses; and
electing a first node in the queue as the leader node.

19. The computer program product of claim 18, wherein a node located in the queue that subsequently fails to provide a heartbeat response is removed from the queue.

20. The computer program product of claim 18, wherein a node not located in the queue that subsequently provides a heartbeat response is placed in an appropriate position in the queue.

21. The computer program product of claim 17, wherein each node of the secured networked virtualization environment has a private IP address and internal communication amongst the nodes of the secured networked virtualization environment is made through private IP addresses.

22. The computer program product of claim 17, wherein generating the reverse tunnel comprises:
identifying, by the leader node, a port number at the external entity through which the external entity communicates with the leader node.

23. The computer program product of claim 22, wherein the port number is a statically determined port number.

24. The computer program product of claim 22, wherein the port number is a dynamically determined port number.

25. The computer program product of claim 24, wherein the dynamically determined port number is determined by:
requesting the external entity for an available port number;
receiving the available port number from the external entity; and
utilizing the available port number as the port number at the external entity through which the external entity communicates with the leader node.

26. The computer program product of claim 22, wherein the port number at the external entity through which the external entity communicates with the leader node is associated with the secured networked virtualization environment.

27. The computer program product of claim 22, wherein generating the reverse tunnel comprises performing a secured shell (SSH) command using the port number, the cluster virtual IP address and a public SSH key for the external entity.

28. The computer program product of claim 17, wherein the external entity is chosen by iterating over a list of external entities associated with the secured networked virtualization environment until the external entity is identified.

29. The computer program product of claim 28, wherein the external entity is identified based on its ability to establish communication with the secured networked virtualization environment.

30. The computer program product of claim 28, wherein the list of external entities is updated periodically.

31. The computer program product of claim 30, wherein the list of external entities is updated by:
   requesting a current external entity from the list of external entities for an updated list of external entities;
   receiving the updated list of external entities; and
   modifying the list of external entities associated with the secured networked virtualization environment with the updated list of external entities.

32. The computer program product of claim 28, wherein the list of external entities associated with the secured networked virtualization environment is assigned to the secured networked virtualization environment based on a unique identifier for the secured networked virtualization environment.

33. A system for providing external access into a secured networked virtualization environment, comprising:
   a computer processor to execute a set of program code instructions; and
   a memory to hold the program code instructions, in which the program code instructions comprises program code to perform: performing a leadership election amongst nodes of the secured networked virtualization environment that elects a leader node that directs external communication from an external entity to one or more nodes within the secured networked virtualization environment; assigning a cluster virtual IP address to the leader node, wherein the cluster virtual IP address is a different IP address than an IP address of the leader node; generating a reverse tunnel, using a processor of the leader node, based at least in part on the cluster virtual IP address, wherein the external communication from the external entity into the one or more nodes within the secured networked virtualization environment is sent via the reverse tunnel associated with the cluster virtual IP address; identifying failure of the leader node; performing the leadership election amongst the nodes of the secured networked virtualization environment to elect a new leader node; assigning the cluster virtual IP address to the new leader node; and generating another reverse tunnel by the new leader node to allow the external entity to communicate with the secured networked virtualization environment.

34. The system of claim 33, in which the program code instructions further comprise program code to perform leadership election by:
   receiving heartbeat responses for the nodes of the secured networked virtualization environment;
   forming a queue with the nodes that provide heartbeat responses, wherein the nodes that provide heartbeat responses are placed in the queue in an order that the nodes provide their heartbeat responses; and
   electing a first node in the queue as the leader node.

35. The system of claim 34, wherein a node located in the queue that subsequently fails to provide a heartbeat response is removed from the queue.

36. The system of claim 34, wherein a node not located in the queue that subsequently provides a heartbeat response is placed in an appropriate position in the queue.

37. The system of claim 33, wherein each node of the secured networked virtualization environment has a private IP address and internal communication amongst the nodes of the secured networked virtualization environment is made through private IP addresses.

* * * * *